Aug. 18, 1931.  B. ROCKLIN  1,819,623
KNIFE
Filed Dec. 29, 1928
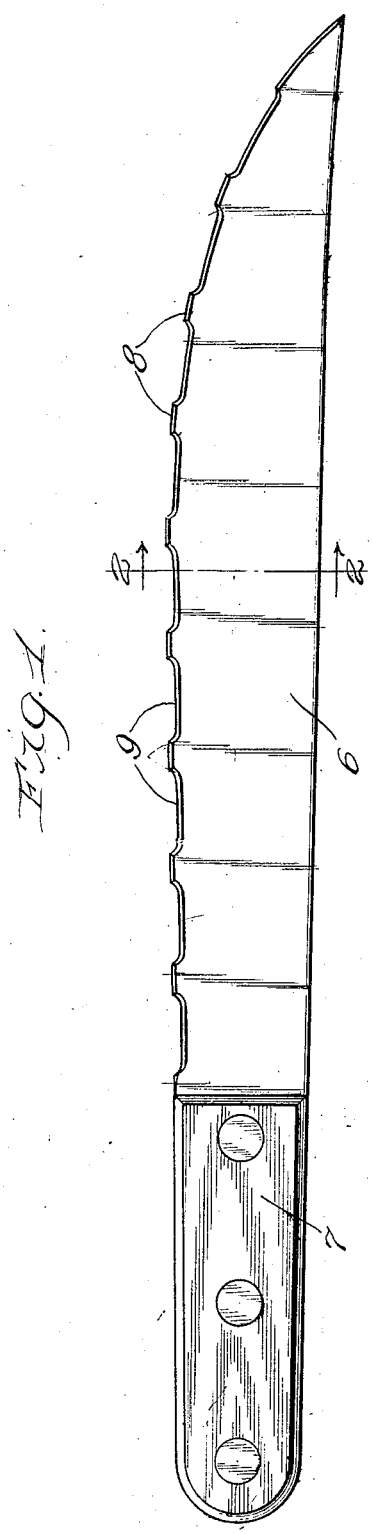
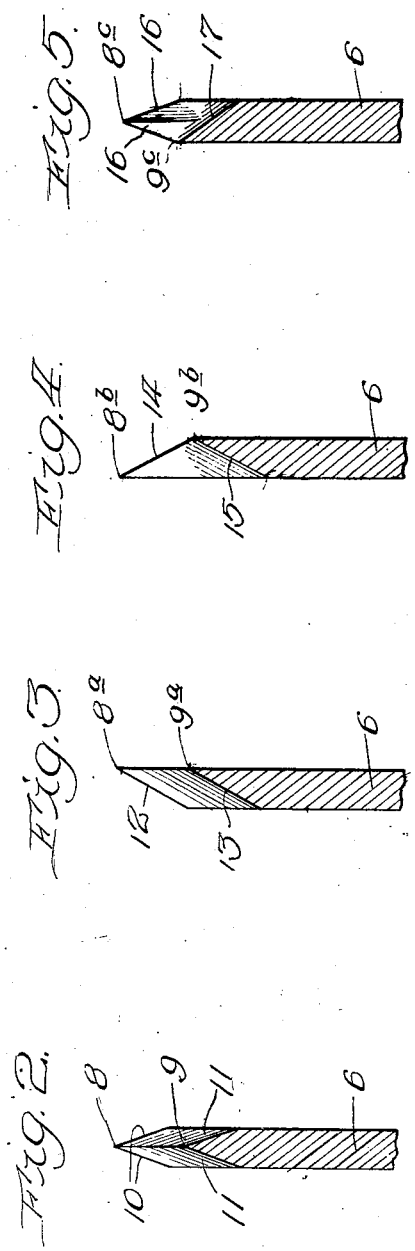
Inventor
Benjamin Rocklin
By Burton & Hills
Attys.

Patented Aug. 18, 1931

1,819,623

UNITED STATES PATENT OFFICE

BENJAMIN ROCKLIN, OF CHICAGO, ILLINOIS

KNIFE

Application filed December 29, 1928. Serial No. 329,086.

My invention relates to that general class of knives or cutting instruments, wherein a single blade of comparatively thin material is sharpened at one or both edges and the sharpened edge is pressed against and drawn along upon the material to cut the same.

The object of my invention is to produce a device of the kind described adapted to operate with the greatest ease, speed and efficiency, and to produce a smooth clean surface on substantially any material.

To this end my invention consists in the novel construction, design and disposition of parts herein shown and described and more particularly pointed out in the claims.

In the accompanying drawings wherein like or similar reference characters indicate like or corresponding parts:

Fig. 1 is a side elevation of my improved knife.

Fig. 2 is a section taken on line 2—2 of Fig. 1.

Fig. 3 is a view similar to Fig. 2 showing a slightly modified manner of sharpening the same.

Fig. 4 is a view similar to Figs. 2 and 3 showing another manner of sharpening.

Fig. 5 is a view similar to Figs. 2, 3 and 4 showing still another method of sharpening.

In the drawings for the purpose of illustration, I have shown a knife having a cutting blade 6 with the handle 7, of the usual form and material, suitable for the particular article to be operated upon. The cutting edge of the blade 6 is provided with any desired number of truncated projections 8 formed in the plane of the blade, the junctions of the margins of the projections 8 with the parts 9 of the blade being preferably slightly curved as shown so that as the cutting edge of the blade 6 which preferably extends the entire length of the blade from the handle 7 and includes the parts 9, and projections 8 as well as the inclined portions or slopes between them is drawn along in operation a plurality of slightly inclined cutting surfaces are presented to the material thus, producing a very gentle acceleration of the cutting process.

The spacing of the projections 8 which are preferably low and with their top or outer edges substantially parallel with the adjacent portions 9 of the blade is preferably as nearly uniform as practicable; the distance between the projections while considerably greater than the length of the projections being somewhat dependent upon the size of the knife and the material to be cut; for example, in a knife for cutting bread or cake, I have found a cutting edge approximately nine inches long with projections 8 about three-eighths of an inch long and spaced about one and one-half inches from center to center to be very satisfactory.

In the form shown in Fig. 2, the entire cutting edge of my improved knife is sharpened as shown by the beveled portions 10 and 11 substantially uniformly from both sides, while in Fig. 3, a blade is shown sharpened as shown at 12 and 13 entirely or mostly from one side so as to bring the cutting edge shown at 8-A and 9-A adjacent the side of the blade.

In the form shown in Fig. 4, the blade is sharpened as shown at 14 and 15 to form the cutting edges of the projections 8b near one side of the blade while the cutting edges of the parts 9b are formed near the opposite side and the edge on the slopes of the projections extend across the blade from near one side to near the opposite side. This form of my improvement produces a very rapid cutting knife especially for bread, cake or the like having a soft body and a rather brittle crust or coating.

In the form shown in Fig. 5 the projections 8c are sharpened as shown at 16 from both sides substantially as shown in Fig. 2, while the parts 9c between the projections are sharpened as shown at 17 to bring the cutting edge near one side of the blade. This form is especially desirable for cake having a very delicate coating or bread or biscuits having a very brittle or easily injured outer covering.

In use it has been demonstrated that my improved knife cuts the most delicate resilient substances with rapidity leaving a clean smooth surface and where a brittle, friable crust or coating over-lies a soft resilient body there is practically no breakage, crumbling or even objectionable chipping of the crust.

Having thus described my invention, it is obvious that various immaterial modifications may be made in the same without departing from the spirit of my invention, hence I do not wish to be understood as limiting myself to the exact construction, arrangement, combination of parts or uses mentioned.

What I claim as new and desire to secure by Letters Patent is:

1. A knife having a blade and means for operating the same, the cutting edge of said blade being sharpened and continuous along one edge of said blade and having a series of short uniform truncated projections formed thereon in the plane of the blade, the portions between said projections being substantially longer than said projections and connected thereto by inclined cutting portions.

2. A knife having a blade and means for operating the same, the cutting edge of said blade being sharpened and continuous along one edge of said blade and having a series of low, evenly spaced, uniform tapering truncated projections formed thereon in the plane of the blade, the portions of said blade between said projections being substantially longer than the adjacent projections and sharpened to form the cutting edge substantially in the plane of one side of the blade.

3. A knife having a blade and means for operating the same, the cutting edge of said blade being sharpened and having a series of low, evenly spaced, uniform truncated projections formed thereon in the plane of the blade the portions of said blade between said projections being substantially longer than the adjacent projections and sharpened to form the cutting edge substantially in the plane of one side of the blade while the projections are sharpened to form the cutting edge substantially in the plane of the opposite side of said blade.

In testimony whereof, I have hereunto signed my name.

BENJAMIN ROCKLIN.